United States Patent [19]
Elleder et al.

[11] Patent Number: 6,126,427
[45] Date of Patent: Oct. 3, 2000

[54] CURING PRESS WITHDRAWING DEVICE

[75] Inventors: Pavel Elleder; Zdeněk Tupy, both of Plzeň, Czech Rep.

[73] Assignee: Skoda TS a.s., Czech Rep.

[21] Appl. No.: 09/159,543

[22] Filed: Sep. 24, 1998

[30] Foreign Application Priority Data

Sep. 24, 1997 [CZ] Czech Rep. .............. 3008-97

[51] Int. Cl.[7] ............................................. B29C 35/02
[52] U.S. Cl. ............................................................ 425/38
[58] Field of Search ............................................... 425/38

[56] References Cited

U.S. PATENT DOCUMENTS

| | | | |
|---|---|---|---|
| 3,097,394 | 7/1963 | Mallory et al. | 425/38 |
| 3,471,895 | 10/1969 | Ulm et al. | 425/38 |
| 3,530,533 | 9/1970 | Turk et al. | 425/38 |
| 4,068,989 | 1/1978 | Cantarutti | 425/38 |
| 4,608,219 | 8/1986 | Singh et al. | 425/38 |
| 4,681,521 | 7/1987 | Grotkasten | 425/38 |
| 4,768,937 | 9/1988 | Singh | 425/38 |
| 4,950,142 | 8/1990 | Katayama et al. | 425/38 |

FOREIGN PATENT DOCUMENTS

| | | |
|---|---|---|
| 0037703 | 10/1981 | European Pat. Off. . |
| 0684126 | 11/1995 | European Pat. Off. . |

Primary Examiner—James P. Mackey
Attorney, Agent, or Firm—Burns, Doane, Swecker & Mathis, LLP

[57] ABSTRACT

A tire withdrawing device for removing a tire from a mold chamber includes two rotatable blades. The blades are mounted on pins which are rotatable in bushings. Arms mounted on the pins are connected to a linear motor to rotate the blades for grasping of a finish tire during removal. The withdrawing device is use to grasp the tire as it is moved from the mold onto a conveying device for transporting the tire away from the mold.

12 Claims, 1 Drawing Sheet

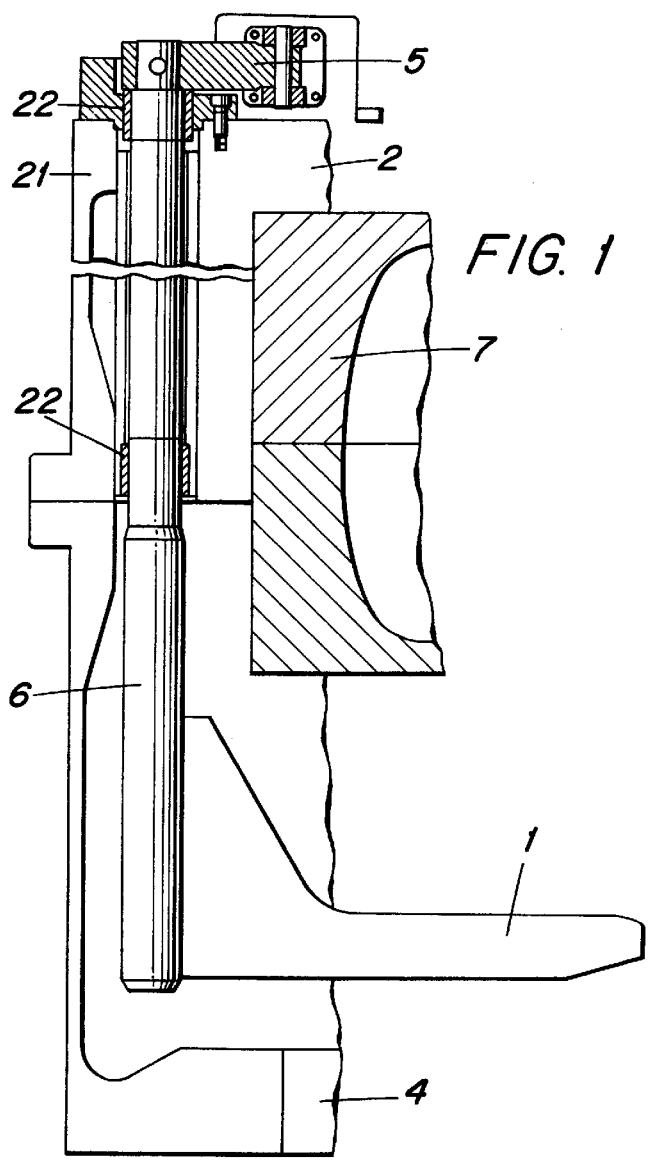
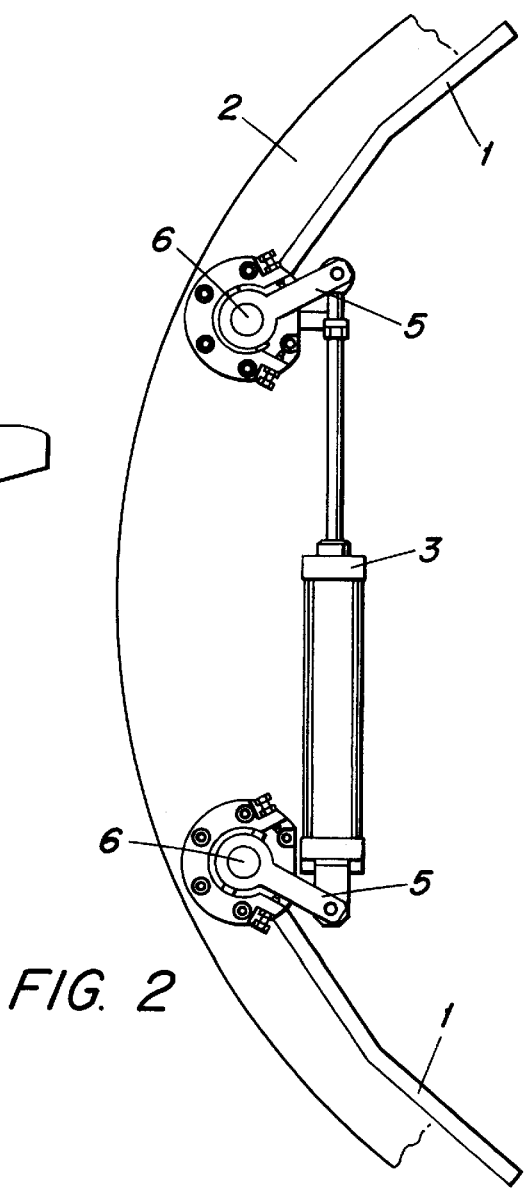

CURING PRESS WITHDRAWING DEVICE

This application claims priority under 35 U.S.C. §§119 and/or 365 to PV 3008-97 filed in the Czech Republic on Sep. 24, 1997; the entire content of which is hereby incorporated by reference.

BACKGROUND OF THE INVENTION

1. Field of the Invention

The invention relates to a withdrawing device for a curing press that serves to withdraw a finished tire from a mold.

2. Brief Description of the Related Art

Previously used withdrawing devices for removing tires from a curing press mold served both for loading green tires into the mold, and for withdrawing the finished tires as well. These devices were, in substance, manually operated manipulators. Manipulation of the tires was done in concurrence with the operation of the curing press, and, therefore, there was a poor level of work safety. To address these safety problems single-purpose devices were introduced which were located in a rear section of the curing press, and, consequently, were out of the operator's reach. These manipulation devices form a separate system group of the press that is completed with an inclined chute for moving the finished tires away from the mold. The formed and cured tire is supported by the manipulation device and transported onto the inclined chute, along which the tire moves out of the reach of the curing press. These devices, that provide an increased level of the work safety, are complex and demanding both for a manufacture, adjustment, and subsequent control as well. They also have a high failure rate which causes outages and subsequent reductions in productivity.

SUMMARY OF THE INVENTION

A withdrawing device according to the present invention eliminates the above deficiencies. The withdrawing device includes at least one pair of blades supported on pins which are rotatable in bushings connected with the upper part of the mold chamber. In this way the withdrawing device executes a lifting motion to lift the tire with the upper part of the mold chamber. Then, as a result of the rotatable arrangement of the pins in the bushings, the blades are rotated toward the tire to execute a gripping motion.

To maintain integrity between an outer surface of the tire and the upper part of the mold chamber there are preferably bushings placed inside the chamber between the tire and mold.

According to one aspect of the present invention, the pins, protruding out of the upper part of the chamber, are each provided with an arm. A linear motor can be set between the two arms, or between individual arms and the upper part of the chamber. Control of the linear motor, induces a gripping force among the blades, necessary for gripping of the finished tire.

BRIEF DESCRIPTION OF THE DRAWINGS

FIG. 1 is a vertical cross section through the mold chamber taken along an axis of one of the pins; and FIG. 2 is a partial plan view of the upper part of the chamber with a linear motor set between the pair of arms.

DETAILED DESCRIPTION OF THE PREFERRED EMBODIMENT

The withdrawing device includes two bushings 22 placed between a shell 21 of the upper part of the chamber 2 and the mold 7. A pin 6 is pivoted in the bushings 22. A lower part of each of the pins 6 is ended with the blade 1. An opposite end of each of the pins 6 protrudes over the chamber 2, where the pins are provided with arms 5. Although the present invention has been illustrated and described with two pins 6 and two blades 1, it should be understood that there is at least one pair of thus designed pins 6. Above the upper part of the chamber 2, the pair of arms 5 are joined together by a linear motor 3 that is, in this case, formed by a pneumatic cylinder. Alternatively, the arms 5 may be connected by individual linear motors to the upper part of the chamber. To improve safety, it is suitable to provide the linear motor 3 and the arms 5 with a common cover.

When the upper part of the mold chamber 2 fits close to the fixed part 4 of the mold chamber the blades 1 are initially opened, and they are situated in a gap between the outer shell of the fixed part 4 and mold 7. When the upper part of the chamber 2 is lifted far enough from the fixed part 4, that the blades 1 are above the lower part of the mold 7, the blades 1, by action of the linear motor 3, will be rotated toward each other. Thus, the finished tire which has been lifted with the upper part of the mold 7 and is situated over the lower part of the chamber, will be grasped by the blades 1. The tire, that is not illustrated, subsequently moves simultaneously with the upper part of the chamber 2 over a conveying device, such as a chute provided with conveying rollers. The blades 1 are then opened, and the tire will touch down onto the waiting conveying device which transports the tire away from the mold.

What is claimed is:

1. A withdrawing device for a curing press comprising:
   a curing press having an upper part which is movable with respect to a lower part;
   a pair of blades for grasping a tire as it is removed from the lower part of the curing press; and
   a pair of pins rotatably mounted on the upper part of the curing press and having one of the blades connected to a lower end of each of the pins.

2. The withdrawing device of claim 1, wherein the pins are rotatably mounted in bushings.

3. The withdrawing device of claim 2, wherein the bushings are positioned between a shell of the curing press and an upper part of a mold chamber.

4. The withdrawing device of claim 3, wherein an upper end of each of the pins is connected to an arm and the arms are manipulated by at least one linear motor to grasp the tire with the blades.

5. The withdrawing device of claim 4, wherein the arms are connected to one another by the at least one linear motor.

6. The withdrawing device of claim 1, wherein an upper end of each of the pins is connected to an arm and the arms are manipulated by at least one linear motor to grasp the tire with the blades.

7. The withdrawing device of claim 6, wherein the arms are connected to one another by the at least one linear motor.

8. The withdrawing device of claim 1, wherein an upper end of at least one of the pins is connected to an arm and the arm is manipulated by a linear motor connected between the upper part of the curing press and the arm.

9. A withdrawing device for a curing press comprising:
   a pair of rotatable blades rotatably mounted on an upper movable part of a mold chamber, the blades rotatable between an open position in which the blades are positioned between the mold chamber and a shell of the curing press, and a closed position in which the blades grasp a tire for removal from the press.

10. The withdrawing device of claim 9, wherein the rotatable blades are mounted on pins which are pivoted in bushings connected with the upper part of the mold chamber.

11. The withdrawing device of claim 10, wherein the bushings are located between the shell and the upper part of the chamber.

12. The withdrawing device of claim 10, wherein the blades are rotated between the open position and the closed position by a linear motor connected between arms of the pins.

* * * * *